United States Patent [19]

Hofmann

[11] Patent Number: 4,638,336

[45] Date of Patent: Jan. 20, 1987

[54] COVER FOR VACUUM INK PRINTING HEAD

[75] Inventor: Wilfried Hofmann, Taufkirchen, Fed. Rep. of Germany

[73] Assignee: Agfa-Gevaert AG, Leverkusen, Fed. Rep. of Germany

[21] Appl. No.: 767,356

[22] Filed: Aug. 19, 1985

[30] Foreign Application Priority Data

Sep. 5, 1984 [DE] Fed. Rep. of Germany ....... 3432620

[51] Int. Cl.⁴ ............ G01D 15/18

[52] U.S. Cl. ............ 346/140 R

[58] Field of Search ............ 346/140, 75

[56] References Cited

U.S. PATENT DOCUMENTS

| | | | |
|---|---|---|---|
| 3,839,721 | 10/1974 | Chen | 346/75 |
| 4,045,802 | 8/1977 | Fukazawa | 346/140 |
| 4,417,259 | 11/1983 | Maeda | 346/140 |
| 4,432,004 | 2/1984 | Glattli | 346/140 |
| 4,533,927 | 8/1985 | Iwagami | 346/140 |
| 4,567,494 | 1/1986 | Taylor | 346/140 |
| 4,571,600 | 2/1986 | Hara | 346/140 |

*Primary Examiner*—Joseph W. Hartary

*Attorney, Agent, or Firm*—Michael J. Striker

[57] ABSTRACT

A cover for nozzles of vacuum ink printing head has a circumferential sealing element arranged to abut against an end side of a printing head, and a diaphragm arranged so that the sealing element and the diaphragm together form a pressure chamber.

14 Claims, 3 Drawing Figures

COVER FOR VACUUM INK PRINTING HEAD

BACKCROUND OF THE INVENTION

The present invention relates to a cover for nozzles of a vacuum ink printing head.

The utilization of fast drying inks, for example solution inks in ink printing head in accordance with vacuum ink spraying process requires an auxiliary means which prevents drying of the ink on the ends of the nozzles in stoppage position or the position of non use of the printing head. The ink miniscus formed in the nozzle must remain intact, and the ink must not be pressed back into the nozzle passage under the action of outer pressure. The pressure produced in front of the nozzles must therefore be smaller than the surface tension of the ink meniscus in the nozzle ends. This is not always guaranteed in the known printing heads.

SUMMARY OF THE INVENTION

Accordingly, it is an object of the present invention to provide a cover for nozzles of a vacuum ink printing head, which avoids the disadvantages of the prior art.

More particularly, it is an object of the present invention to provide a cover for nozzles of a vacuum ink printing head, which air-tightly closes the nozzles and therefore protects them from drying, without applying a closing pressure onto the ink meniscuses in the nozzles of the printing head.

In keeping with these objects and with others which will become apparent hereinafter, one feature of the present invention resides, briefly stated, in a cover for nozzles of a vacuum ink printing head which has a circular sealing element arranged to abut against an end side of a printing head, and a diaphragm arranged in a flat side of the cover so that the sealing element and the diaphragm together form a pressure chamber.

When the cover is designed in accordance with the present invention, it reliably closes the nozzles of the vacuum ink printing head in air-tight manner and therefore prevents if from drying and at the same time it does not apply a closing pressure to the ink meniscuses in the nozzles of the printing head.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
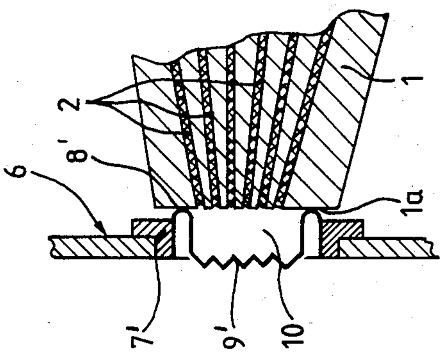
FIG. 2 is a view showing a section of the inventive cover in accordance with another embodiment of the present invention.

The drawings show a cover for a vacuum ink printing head, and a vacuum ink printing head itself on an enlarged scale. For better understanding of the invention, the operational principle of a vacuum ink printing head is shortly illustrated in FIG. 1. The printing head as a whole is identified with reference numeral 1. It has ink spraying nozzles identified with reference numeral 2 and having an end side which is identified with reference numeral 1*a*. The printing head has an ink supply container 3 and ink supply conduits which lead from the supply container 3 to the nozzles 2 and are identified with reference numeral 4.

Piezo-electric pipes 5 are arranged in each nozzle 2 at a distance from the outlet opening of each nozzle. When current is applied, the pipes 5 shrink and press ink drops to the outlet openings of the nozzle and onto sheets to be printed. When the current is turned off from the piezo-electric pipes 5, they expand again. The ink surface which lies in each nozzle outlet opening, forms a meniscus which is concave toward the outside area as slightly shown in FIG. 1. The meniscus in each nozzle outside opening has a considerable surface tension. It is so high that the ink cannot be aspirated from the nozzle outlet opening into the nozzle 2 during expansion of the piezo-electric pipes 5, but the new ink can be aspirated from the supply container 3.

With the use of fast drying inks which are mixed with fast evaporating solvents there is a danger during long stoppage or nonuse, that the ink meniscuses in the nozzles are dried and the printing head becomes nonuseable. On the other hand there is the danger that during mounting of a cover which closes the nozzles 2 with the ink meniscuses, the instantaneous air pressure will be so high that the surface tension of the ink meniscuses in the nozzles will not be maintained and the meniscuses will be destroyed. As a result of this the ink flows back from the nozzles into the piezo-electric pipes 5 and therefore the printing head becomes inoperative. In accordance with the present invention a special cover is provided for the ink printing head 1 which is formed so that during mounting of such a cover which is identified with reference numeral 6, on the end side 1*a* of the printing head 1, the meniscus-shaped ink surfaces in the nozzles 2 are maintained and cannot be dried. The cover 6 in accordance with the present invention includes a frame or support part 7. The frame 7 is provided, for example in accordance with FIG. 1, with a circumferential groove 7*a* at a cover end which is arranged to face the end side 1*a* of the numbering box. A sealing ring 8 is inserted in the groove 7*a* and attached to the cover, for example by gluing. A very weak diaphragm 9 is inserted in the frame 7 at a small distance from the end side of the cover and therefore from the sealing ring 8. The diaphragm 9 is clamped or glued in the frame 7. The diaphragm 9 has a tension which is smaller than the surface tension of the ink meniscus in the nozzles 2. The diapragm 9 closes the frame 7 from outside in a light-tight manner.

When during nonuse of the printing head 1 the cover 6 is pressed with its sealing ring 8 against the end side 1*a*, a chamber 10 between the outlet openings of the nozzles 2 and the diaphragm 9 is closed in an air-tight manner. The sealing element 8 forms together with the diaphragm 9 a pressure chamber 10. If the pressure, for example, during sudden insertion of the cover 6, is greater than the surface tension of the ink meniscuses, the diaphragm deflects outwardly and the pressure does not act upon the ink meniscuses. The pressure equilibrium in the pressure chamber 10 provided by the diaphragm 9 reliably prevents bursting of the ink meniscuses and simultaneously their drying, because of the air-tight closure of the nozzles 2. The pressure chamber 10 which is shown as a large chamber in the drawing is actually very small. Thereby a fast saturation of the air in the pressure chamber with moisture, because of evaporated ink solvent takes place. As a result of this, drying of the nozzles 2 and the ink surfaces is reliably avoided over a long time.

Figure 1:
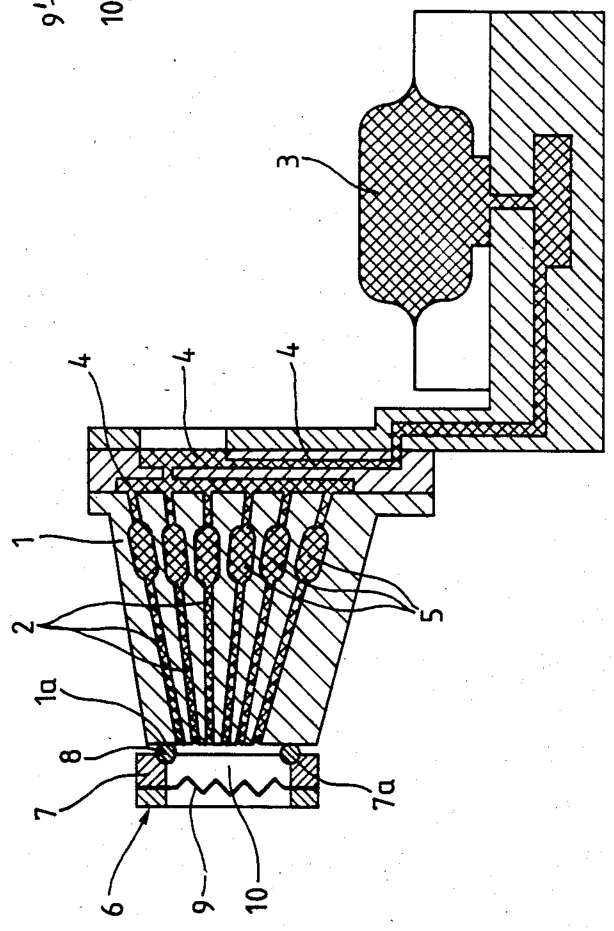
FIG. 1 is a view showing a section of a cover for a vacuum ink printing head in accordance with the present invention.

FIG. 2 shows a further embodiment of the cover 6 in accordance with the invention. The parts of the cover in this Figure which are identical to the parts of the cover shown in FIG. 1 are identified with same reference numerals. A diaphragm 9' of the cover 6 in FIG. 2 is formed cup-shaped. At its open side arranged to face the end side 1*a*, the diaphragm 9' is provided with an edge bead 8' which forms a sealing. The diaphragm 9' and the edge bead 8' are formed of one piece with one another. The edge bead 8' is connected with the frame 7 and somewhat projects over the latter.

Figure 3:
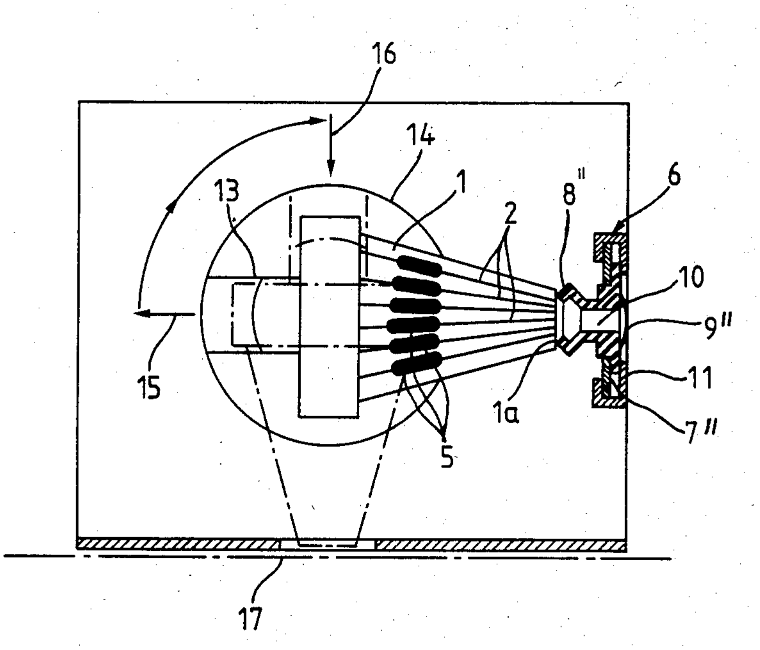
FIG. 3 is a view showing still a further embodiment of the inventive cover and its arrangement for assembling a printing head and the cover.

The cover 6 in accordance with the embodiment shown in FIG. 3 has a closing part which is formed as a suction cup 8'' and composed of soft rubber or synthetic plastic. The suction cup 8'' is supported at the rear side on a frame 7''. A diaphragm 9'' abuts against an open, also suction cup-shaped rear side of the tubular suction cup 8, and pressed by a clamp-like spring frame 11. The diaphragm 9'' is aspirated from the suction cup pressure side and during pressure of the suction cup front side against the printing head end side 1*a*, the first one is firmly aspirated to the last one, so that again the above-mentioned air-tight closed chamber 10 is produced.

The above described embodiments show that it is advisable to produce at least some cover parts of one piece for manufacturing purposes. It is however possible to produce the whole cover in accordance with the present invention as a one-piece member of elastomeric material with various Shore hardnesses. It is believed to be understood that the synthetic plastic materials to be used must be chemically resistant to the ink materials and ink solvent media.

It is possible in principle to arrange the printing head 1 in the spraying device displaceably, so that during the period of nonuse it can be moved back from the plane of the sheet to be printed. In this case the cover 6 is provided with a cuff and slid from the front over the end side 1*a* of the printing head 1 so as to be held there. Also, all other known mounting methods can be used for the cover. FIG. 3 shows an especially advantageous arrangement for bringing the cover 6 and the printing head 1 to abutment against one another. The printing head 1 is here displaceable in a straight guide 13 of a rotatable disc 14. In the extended shown position, the printihg head 1 is turned and displaced relative to the suction cup 8 and therefore is closed by the cover 6, 8'', 9'' in a light-tight manner as described hereinabove.

When the printing head 1 must be brought in its pressure producing position, it is first moved in the direction of the arrow 15 from the cover 6 in the guide 13, and then turned by means of the disc 14 in clockwise direction by 90°. Then, it is displaced in the direction of the arrow 16 against a surface 17 to be printed to its operational position. This operational position is shown in dash-dot lines. When the printing head must be again closed in an air-tight manner, the above described steps are performed in a reversed order. These turning and displacing movements can be naturally performed by a motor and activated by a simple operational button or a keyboard.

It will be understood that each of the elements described above, or two or more together, may also find a useful application in other types of constructions differing from the types described above.

While the invention has been illustrated and described as embodied in a cover for nozzles of a vacuum ink printing head, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cover for nozzles of a vacuum ink printing head having an end side and a predetermined surface tension of meniscus-shaped ink surfaces in its nozzles during non-use, the cover comprising a circumferential sealing element formed so that when the cover is arranged on the printing head said sealing element abuts against the end side of the printing head; and a diaphragm arranged so that said sealing element and said diaphragm together form a pressure chamber, said diaphragm being formed so that its own tension is smaller than the surface tension of the meniscus-shaped ink surfaces in the nozzles during non-use.

2. A cover as defined in claim 1; and further comprising a cover frame, said diaphragm and said sealing element being mounted in said cover frame.

3. A cover as defined in claim 2, wherein said cover frame has an inner edge arranged to face toward the printing head and provided with a groove, said diaphragm being clamped in said cover frame, said sealing element being formed as a sealing ring inserted in said groove.

4. A cover as defined in claim 3, wherein said sealing ring is glued in said groove of said inner edge of said cover frame.

5. A cover as defined in claim 1, wherein said sealing elemant and said diaphragm together form a one-piece element which forms said pressure chamber.

6. A cover as defined in claim 5, wherein said one-piece element formed by said diaphragm and said sealing element is composed of a synthetic plastic material.

7. A cover as defined in claim 1, wherein said diaphragm and said sealing element together form a molded elastomeric part and are composed of elastomers with different hardnesses.

8. A cover as defined in claim 1, wherein said sealing element is formed as a tubular suction cup with one side arranged to be pressed against the printing head and another side arranged so that said diaphragm is pressed against the other side.

9. A cover as defined in claim 8; and further comprising a frame-like spring arranged to press said diaphragm against said other side of said tubular suction cup.

10. A combination of a vacuum ink printing head and a cover therefor, comprising a printing head having a plurality of nozzles and end side and a predetermined surface tension of meniscus-shaped ink surfaces in its nozzles during non-use; and a cover having a circumferential sealing element arranged so that when said cover is mounted on said printing head said sealing element abuts against said end side of said printing head, said cover also having a diaphragm arranged so that said sealing element and said diaphragm together form a pressure chamber, said diaphragm being formed so that its own tension is smaller than the surface tension of the meniscus-shaped ink surfaces in the nozzles during non-use.

11. A combination as defined in claim 10, wherein said printing head is movable relative to said cover between a first position for printing on a sheet to be printed and a second position for closing said printing head with said cover, said cover and said printing head being formed so that in said second position they are movable toward one another for closing of said printing head and they are movable away from one another for opening of said printing head.

12. A combination as defined in claim 10; and further comprising a turnable disc, said printing head being arranged radially displaceable in said turnable disc so that in a position which is opposite to a sheet to be printed, angular relative to the sheet and opposite to said cover, it is turnable and radially displaceable relative to the sheet and said cover.

13. A cover for nozzles of a vacuum ink printing head having an end side, the cover comprising a circumferential sealing element formed so that when the cover is arranged on the printing head said sealing element abuts against the end side of the printing head; a diaphragm arranged so that said sealing element and said diaphragm together form a pressure chamber, said sealing element and said diaphragm together forming a one-piece element which forms said pressure chamber; and a cover frame having a cylindrical cutout, said one-piece element formed by said sealing element and said diaphragm lying in said cutout, said cover frame having an edge which is arranged to face toward the printing head said one-piece element being mounted by said sealing element on said edge of said cover frame.

14. A cover as defined in claim 13, wherein said one-piece element is formed with said sealing element on said edge of said cover frame.

* * * * *